(12) United States Patent
Keough et al.

(10) Patent No.: US 8,878,840 B2
(45) Date of Patent: Nov. 4, 2014

(54) DEVICES AND METHODS FOR DISPLAYING A SUB-SECTION OF A VIRTUAL MODEL

(75) Inventors: Ian Keough, Culver City, CA (US); Daniel Cozza, South Boston, MA (US); Joshua L. Kanner, Cambridge, MA (US); Adam H. Omansky, Charlestown, MA (US)

(73) Assignee: Autodesk, Inc., San Rafael, CA (US)

( * ) Notice: Subject to any disclaimer, the term of this patent is extended or adjusted under 35 U.S.C. 154(b) by 330 days.

(21) Appl. No.: 13/435,709

(22) Filed: Mar. 30, 2012

(65) Prior Publication Data

US 2013/0235029 A1 Sep. 12, 2013

Related U.S. Application Data

(60) Provisional application No. 61/607,295, filed on Mar. 6, 2012.

(51) Int. Cl.
*G06T 15/00* (2011.01)

(52) U.S. Cl.
USPC .......................................... 345/419; 345/619

(58) Field of Classification Search
CPC ..... G06Q 10/101; G06Q 10/10; G06Q 30/04; G06Q 30/0601; G06F 17/30286
USPC .................................................. 345/419, 619
See application file for complete search history.

(56) References Cited

U.S. PATENT DOCUMENTS

| | | |
|---|---|---|
| 5,915,115 A | 6/1999 | Talati |
| 5,999,185 A * | 12/1999 | Kato et al. ................... 345/420 |
| 6,487,457 B1 | 11/2002 | Hull |
| 6,567,829 B1 | 5/2003 | Ter Horst |
| 6,598,056 B1 | 7/2003 | Hull |
| 6,982,712 B2 | 1/2006 | Ohto |
| 7,130,775 B2 | 10/2006 | Takagaki |
| 7,313,759 B2 * | 12/2007 | Sinisi ............................ 715/203 |
| 7,328,233 B2 | 2/2008 | Salim |
| 7,346,889 B1 | 3/2008 | Semenov |
| 7,720,804 B2 | 5/2010 | Fazal |
| 7,809,536 B1 | 10/2010 | Browning |
| 7,860,838 B2 | 12/2010 | Gupta |

(Continued)

OTHER PUBLICATIONS

Acceleration Techniques for GPU-based Volume Rendering by J. Kruger and R. Westermann 2003 Computer Graphics and Visualization Group, Technical University Munich pp. 1-12.*

(Continued)

*Primary Examiner* — Maurice L McDowell, Jr.
(74) *Attorney, Agent, or Firm* — Fish & Richardson P.C.

(57) ABSTRACT

The invention generally relates to devices and methods for displaying a sub-section of a virtual model. In certain aspects, methods herein involve determining a portion of a virtual model within a user's field of view, determining a maximum load value that can be accommodated by the device, and displaying a sub-section of the virtual model based upon the portion that is within the user's field of view and the maximum load value accommodated by the device. In other aspects, devices herein include hardware and software that cause a CPU of the device to determine a portion of a virtual model within a user's field of view, determine a maximum load value that can be accommodated by the device, and display a sub-section of the virtual model based upon the portion that is within the user's field of view and the maximum load value accommodated by the device.

32 Claims, 6 Drawing Sheets

(56) References Cited

U.S. PATENT DOCUMENTS

| | | |
|---|---|---|
| 7,881,989 B2 | 2/2011 | Moore |
| 7,904,302 B2 | 3/2011 | Adendorff |
| 7,949,690 B2 | 5/2011 | McArdle |
| 7,982,628 B2 | 7/2011 | Plocher |
| 8,010,650 B2 | 8/2011 | Strasser |
| 2003/0023412 A1 | 1/2003 | Rappaport |
| 2004/0153536 A1 | 8/2004 | Strassner |
| 2004/0239494 A1 | 12/2004 | Kennedy |
| 2005/0273788 A1 | 12/2005 | Gupta |
| 2006/0136180 A1* | 6/2006 | Hansen et al. .............. 703/1 |
| 2008/0015823 A1 | 1/2008 | Arnold |
| 2008/0072231 A1* | 3/2008 | Yoshida .............. 718/104 |
| 2008/0247635 A1* | 10/2008 | Davis et al. .............. 382/152 |

OTHER PUBLICATIONS

A Framework of Virtual Design for Product Customization by Mitchell M. Tseng, Jianxin Jiao, Chuan-Jun Su 1997 p. 1-8 Department of Industrial Engineering & Engineering Management The Hong Kong University of Science & Technology.*

* cited by examiner

DEVICES AND METHODS FOR DISPLAYING A SUB-SECTION OF A VIRTUAL MODEL

RELATED APPLICATION

The present application claims the benefit of and priority to U.S. provisional application Ser. No. 61/607,295, filed Mar. 6, 2012, the content of which is incorporated by reference herein in its entirety.

FIELD OF THE INVENTION

The invention generally relates to devices and methods for displaying a sub-section of a virtual model on a portable device.

BACKGROUND

Building Information Modeling (BIM) and/or Facility Information Modeling (FIM) involves producing an electronic model of a facility, including a building structure, such as a hospital, or a non-building structure, such as a bridge. These modeling techniques generally utilize object-oriented building development processes with a related set of software applications that utilize multi-dimensional, digital modeling concepts, information technology and software interoperability to plan, design, construct, commission, and operate, maintain, re-use and repair a building project. Building Information Modeling and/or Facility Information Modeling can communicate its details including building geometry, spatial relationships, performance information, geographic information, and quantities and properties of building assemblies, systems, equipment and components to numerous persons associated with a construction project. Building Information Modeling and/or Facility Information Modeling increases productivity in building planning, design, construction, commissioning, and operations, maintenance, re-use and repair.

BIM/FIM models are important in the field because the field is the point of construction, the point of commissioning, and the point of operations and maintenance, i.e., it is the physical place and spatial location where construction personnel and operations and maintenance personnel require building data and facility data to perform field management programs and processes.

However, a problem with Building Information Modeling and/or Facility Information Modeling is that the produced electronic models are not readily accessible in the field, i.e., such models are not assessable at a job-site on portable devices such as mobile smart phones or tablet computers. Particularly, portable devices lack the required memory for viewing large file size, such as the three-dimensional electronic models produced from BIM/FIM modeling. When faced with trying to load a file that exceeds the allowable memory limits, the portable device is generally designed to shut down and close immediately.

SUMMARY

The invention generally relates to methods for bringing three dimensional BIM/FIM models to portable devices in the field. Methods of the invention are accomplished by accounting for memory limits of the portable device while also only displaying a portion of the entire BIM/FIM model at any moment in time. Methods of the invention determine a portion of a virtual model that is within a field of view of a user, determine a maximum memory load value that can be accommodated by the device, and then display only a sub-section of the entire virtual model based upon the portion that is within the user's field of view and the maximum memory load value that can be accommodated by the device. As the user moves through a building project, methods of the invention provide an updated display to the user, reflecting the user's new position within the project. Each updated display is based upon the portion of the model that is within the user's field of view and the maximum memory load value that can be accommodated by the device. In this manner, BIM/FIM models can be displayed on portable devices so that field personnel have easy and ready access to building data and facility data to perform field management programs and processes.

It will be appreciated that methods described herein are not limited to BIM/FIM models; rather, such methods are applicable to any large data files (e.g., files that exceed 100 megabytes (MB) or several gigabytes (GB) in size) that need to be displayed on a device having a memory size that cannot handle such large files, such as portable electronic devices (e.g., tablet computers and smart phones). However, methods of the invention are particularly useful with building information models and/or facility information models.

Generally, each displayed sub-section will include at least one object, and in many embodiments, each sub-section will include a plurality of objects. In certain embodiments, methods of the invention further involve loading the objects in a certain order. Order of loading allows methods of the invention to manage the produced display in relation to the memory load capacity of the portable device such that methods of the invention ensure that the most important objects of the user are loaded without reaching the maximum memory load of the device. Particularly, methods of the invention can cease loading objects if the maximum memory load value is reached, thus allowing objects to be displayed without crashing the application. Numerous different techniques may be used to manage loading order. Generally, loading order is based upon at least one parameter such as the object size within the model, proximity of the object within the model to the user, the number of objects, relevance of the object to the user, or a combination thereof.

Generally, the objects will include at least one attribute. In certain embodiments, the attribute relates to building assemblies, materials, systems, sub-systems, equipment, components, elements, materials, and inter-relations thereof in a building project. In other embodiments, the attribute relates to non-building assemblies, materials, systems, sub-systems, equipment, components, elements, materials, and inter-relations thereof in a non-building project. In other embodiments, the attribute relates to at least one field process selected from the group consisting of: issues management, work-to-complete list management, work-to-correct list management, punch list management, quality assurance management, quality control management, environmental management, health management, safety management, sustainability management, field report management, materials management, waste management, commissioning, re-commissioning, retro-commissioning, de-commissioning, handover, turnover, operations, maintenance, repair, retrofit, turnaround, and a combination thereof.

The device may be a device that is capable of making a wired connection, a wireless connection, a cellular connection, or a combination thereof. The device may be a device that functions with access to a computer network, cellular network, or the internet. Alternatively, the device may be a device that functions without access to a computer network, cellular network, or the internet. Generally, the device includes a display and is capable of receiving data transferred via an internet or cellular connection. Exemplary devices include laptop computers, tablet computers, and portable handheld devices (e.g., smart phones).

Another aspect of the invention provides a device for displaying a sub-section of a virtual model that includes a display, a central processing unit (CPU) and storage coupled to the CPU for storing instructions that when executed by the CPU cause the CPU to determine a portion of a virtual model that is within a field of view of a user, determine a maximum load value that can be accommodated by the device, and display a sub-section of the virtual model based upon the portion that is within the user's field of view and the maximum load value that can be accommodated by the device.

DETAILED DESCRIPTION

Figure 1:
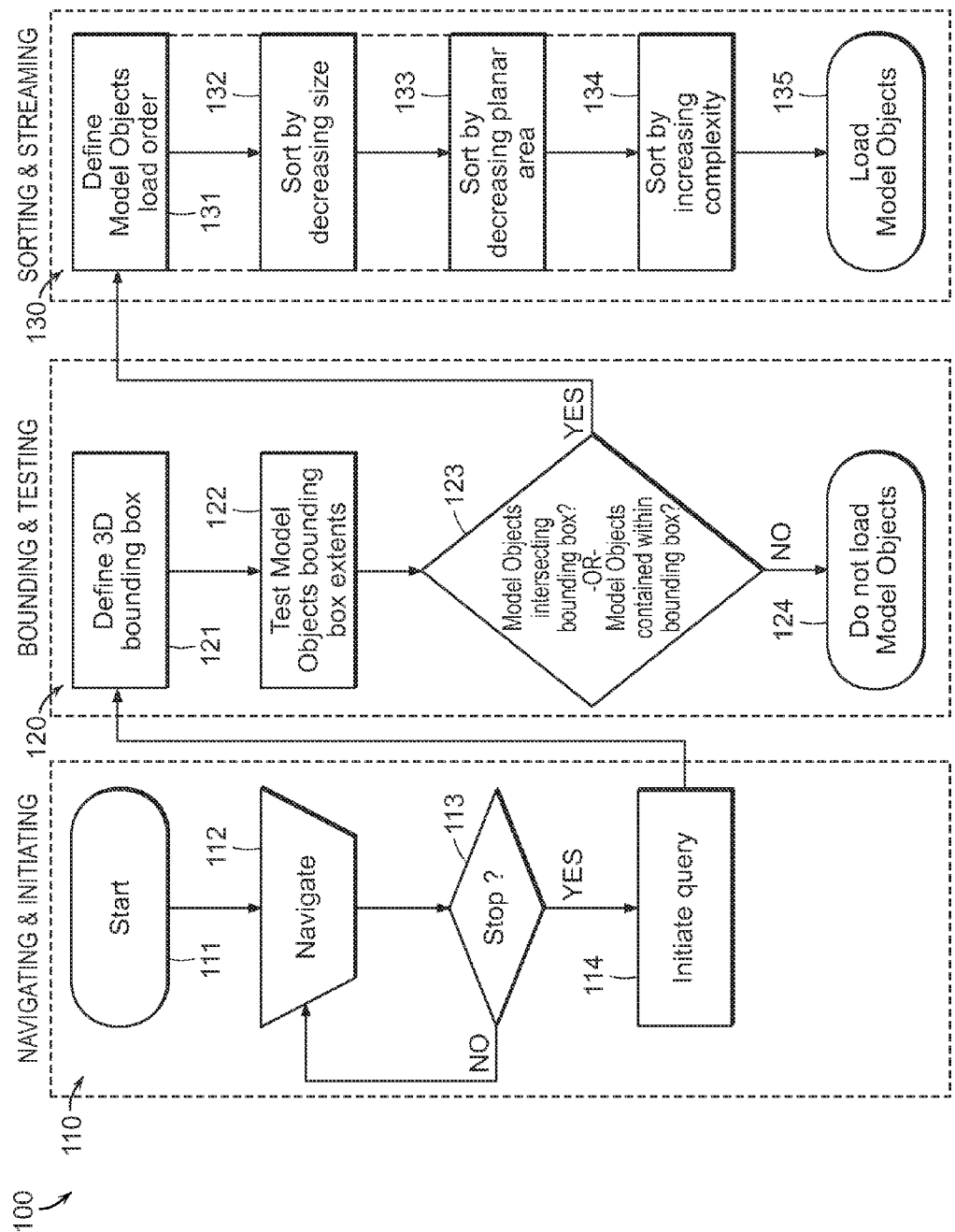
FIG. 1 is a process diagram for conducting methods of the invention.

The invention generally relates to devices and methods for displaying a sub-section of a virtual model. In certain aspects, the invention provides method for displaying a sub-section of a virtual model on a device that include determining a portion of a virtual model that is within a field of view of a user, determining a maximum memory load value that can be accommodated by the device, and displaying a sub-section of the virtual model based upon the portion that is within the user's field of view and the maximum memory load value that can be accommodated by the device.

Devices and methods of the invention allow for streaming of large file size, such as three-dimensional (3D) Building Information Models (BIM) and Facility Information Models (FIM) on devices, particularly, mobile devices, such as mobile computers, tablet computers, pad computers (e.g. Apple iPads), and mobile phones. 3D or 3-D refers to three-dimensional space consisting first of the (x) coordinate and second of the (y) coordinate in the horizontal plane, and third of the (z) coordinate in the vertical plane, based on the Cartesian coordinated system and on Euclidean space. Devices and methods of the invention are useful for dealing with any type of large file that needs to be displayed on a device that has a limited memory capacity and are particularly useful in field management for construction, commissioning, and operations and maintenance, in the architecture, engineering, and construction industry and the facility management industry.

In certain embodiments, devices and methods herein utilize proximity-based object streaming. Proximity-based object streaming allows for sub-sections of large files to be displayed to a user. The sub-section that is displayed is determined in part by the end-user's spatial location virtually, and spatial viewpoint virtually within a virtual model and by the configuration settings defined by the end-user or device, to intelligently manage memory loading on devices, particularly mobile devices.

An important aspect of methods of the invention is that it allows devices to handle any type of geometry, i.e., the model is not a predetermined model. For example, the BIM/FIM model presented to the device may be a small dentist office (having a file size of about 100 megabytes) or a power plant (having a file size of several gigabytes). Thus, regardless of the model that is to be loaded into the device, the methods of the invention allow for the model to be handled so that it can be displayed on the device without requiring changes to the model.

Devices and methods of the invention may be utilized with any large files. In certain embodiments, devices and methods of the invention are used with three-dimensional (3D) BIM/FIM models. A BIM model is an information model structured in a database model format. In certain embodiments, the present invention uses a database model format. Generally, a BIM model includes many model objects or model elements in a relational database. A model object is a portion of the BIM model representing an element, work result, building and building site product, component, equipment, system, or assembly within a building or building site. Examples of model object elements include, but are not limited to: substructure; shell; interiors; services; equipment and furnishings; special construction and demolition; and sitework.

Examples of model object work results include, but are not limited to: existing conditions; concrete; masonry; metals; wood, plastics, and composites; thermal and moisture protection; openings; finishes; specialties; equipment; furnishings; special construction; conveying equipment; fire suppression; plumbing; heating, ventilating, and air-conditioning (HVAC); integrated automation; electrical; communications; electronic safety and security; earthwork; exterior improvements; utilities; transportation; waterway and marine construction; process integration; material processing and handling equipment; process heating, cooling, and drying equipment; process gas and liquid handling, purification, and storage equipment; pollution and waste control equipment; industry-specific manufacturing; equipment; water and wastewater equipment; and electrical power generation.

Examples of model object building and building site products include, but are not limited to: site products; structural and exterior enclosure products; interior and finish products; openings, passages, and protection products; specialty products; furnishings, fixtures and equipment products; conveying systems and material handling products; medical and laboratory equipment; general facility services products; facility and occupant protection products; plumbing specific products and equipment; HVAC specific products and equipment; electrical and lighting specific products and equipment; information and communication specific products and equipment; and utility and transportation products.

Model object elements may be linked in the database to their associated meshes. A mesh is a collection of vertices and faces that defines the shape of a polyhedral object. In certain embodiments, the mesh faces are comprised of triangles. Meshes are stored in the model database as byte streams representing the vertex coordinates and face indices of triangular meshes. Each object record in the database includes transform and bounding box information such that the minimum and maximum coordinates of a bounding box can be spatially indexed using an R-tree. The term "R-tree" refers to a tree data structure used for spatial access methods, i.e., for indexing multi-dimensional information such as geographical coordinates, rectangles, or polygons. This spatial index allows for fast lookup of nearby elements using axis aligned bounding box (AABB) intersection tests.

FIG. 1 is a process diagram 100 for performing methods of the invention. Diagram 100 shows that methods of the invention may be sub-divided into three sequential sub-processes. The first sub-process 110 relates to navigating and initiating. The second sub-process 120 relates to bounding and testing. The third sub-process 130 relates to sorting and streaming. Each of these sub-processes is discussed in further detail below.

As the end-user navigates, the end-user's position in the model acts as the center of a bounding box against which intersection tests are conducted and a selection of objects to be loaded is returned. Objects in the set to be loaded that are already loaded are ignored as are those which do not fall in the forward facing half of the loading volume (i.e. objects "behind" the user are not loaded). Additional heuristics are applied to the order of loading based on object size and vertex count in an attempt to replicate human perception.

Sub-process 110, navigating and initiating, operates continuously, as opposed to at predefined intervals, to optimize performance. Sub-process 110, navigating and initiating, includes the steps of: start 111; navigate 112; stop? 113 (IF 113=NO, go back to Navigate 112) or (IF Stop? 113=YES, then); and initiate query 114. Start 111 describes the start of the process. In more precise terms, sub-process 110 is inter-related with end-user navigation. The present invention continuously checks and tests if the end-user has stopped virtually navigating or virtually traveling through the BIM, then the process initiates. Navigate 112 describes the end-user virtually navigating or virtually traveling through the BIM on display of the mobile device, either by manually moving through the BIM with navigation controls such as zooming, panning, and rotating, or by directly moving to predefined views in the BIM with viewpoints. A viewpoint is a predefined camera position in the 3D model comprised of two vectors, the first representing the location in space of the camera, and the second representing the forward direction of the camera.

Stop? 113 describes the logic gate whereby if the end-user stops virtually navigating through the BIM on display of the mobile device, as shown by Navigate 112, for a period of N seconds, then the present invention initiates the query, as shown by the YES connector forward to Initiate query 114, and on to the second sub-process of bounding and testing 120. Stop? 113 also describes the logic gate whereby if the end-user does not stop and continues virtually navigating through the BIM on display of the mobile device, as shown by Navigate 112, then present invention does not initiate the query, as shown by the NO connector back to Navigate 112.

The second sub-process 120, bounding and testing, describes the process whereby the present invention defines a three-dimensional (3D) bounding box, and involves the following steps: define 3D bounding box 121, test model objects bounding box extents 122, model objects intersecting bounding box? or model objects contained within bounding box? 123 (IF Model Objects intersecting bounding box? or Model Objects contained within bounding box? 123=NO, then); do not load model objects 124.

Define 3D bounding box 121 accelerates the computational processes by serving as the filter to both include and exclude respective Model Objects. The bounding box (also the smallest bounding box, also the minimum bounding box, also the minimum-perimeter bounding box, also the enclosing box) is a term used in three-dimensional (3D) geometry. For a point set in N dimensions, the bounding box refers to the box with the smallest measure (area, volume) within which all the points lie. In the case of the present invention all bounding boxes are axis-aligned, that is, their sides are parallel to the XY, YZ, and XZ planes.

The bounding box is an axis-aligned bounding box (AABB) calculated based on three important criteria: spatial location and spatial viewpoint; algorithms of the present invention; and configuration settings defined by the end-user. The bounding box is not a predefined bounding box or a predefined series of bounding boxes. Rather, the bounding box is calculated based on the three-dimensional (3D) location in the BIM. The bounding box is calculated based on the algorithms of the present invention and based upon configuration settings defined by the end-user or the device, which include but are not limited to the load radius and the stream size.

Test Model Objects bounding box extents 122 describes the process to test the model object's AABB relative to the AABBs of other model objects in the database. Model objects intersecting bounding box? OR Model Objects contained within bounding box? 123 describe the two queries to test for objects to be included in the load. Extents 122 refers to the perimeter of the bounding box, and box 123 represent two tests within the same query, as opposed to two different queries. In box 123, if the answer is NO, then Do not load model objects 124. Accordingly, do not load model objects 124 describes the process where the model objects are not loaded and are excluded from the third sub-process of Sorting and Streaming 130. In box 123, if the answer is YES, then proceed to the third sub-process of Sorting and Streaming 130. This is described in further detail in FIGS. 2-4, discussed below.

The third sub-process 130, sorting and streaming, includes the following steps: (IF Model Objects intersecting bounding box? OR Model Objects contained within bounding box? 123=YES, then); define model objects load order 131; sort by decreasing size 132; sort by decreasing planar area 133; sort by increasing complexity 134; and load model objects 135.

Define model objects load order 131 describes the process of defining the order and sequence by which to load the model objects. Sort by decreasing size 132 describes the process of defining the sort order and sequence by which to load model objects in decreasing size. Accordingly, larger model objects are prioritized before smaller model objects. For example, a model object of a pump, which is generally a larger object, is loaded before a model object of a valve, which is generally a smaller object. Sorting in this manner optimizes the end-users' perception on the display of the mobile device, as end-users' typically visually identify and visually understand larger objects before smaller objects, in a three-dimensional (3D), spatial context. The selection of objects to load and the sorting thereof are one process and one query in the database, and not separate processes and not many queries in the database, which accelerates the process.

Sort by decreasing planar area 133 describes the process of defining the sort order and sequence by which to load model objects in decreasing planar area. Accordingly, model objects with larger planar area are prioritized before model objects with smaller planar area. For example, a model object of a floor slab, which generally has a larger planar area, is loaded before a model object of a door, which generally has a smaller planar area. Sorting in this manner optimizes the end-users' perception on the display of the mobile device, as end-users' typically visually identify and visually understand objects with larger planar area before objects with smaller planar area, in a three-dimensional (3D), spatial context.

Sort by increasing complexity 134 describes the process of defining the sort order and sequence by which to load model objects in increasing complexity. Accordingly, model objects with lesser complexity are prioritized before model objects with greater complexity. The term "complexity" refers to the end-users' perception of complexity of a given three-dimensional (3D) shape based on its geometrical and/or topological properties. For example, a model object of a tank (or a simple cylinder), which generally has a lesser complexity, is loaded before a model object of a fan assembly (or a collection of joined cones closed under taking intersections and faces, within a rectangular solid), which generally has a greater complexity. Sorting in this manner optimizes the end-users' perception on the display of the mobile device, as end-users' typically visually identify and visually understand objects with lesser complexity before objects with greater complexity, in a three-dimensional (3D), spatial context.

Load model objects 135 describes the end of the process, where the present invention loads the model objects for display on the mobile device. In more precise terms, Load model objects 135 describes the process where the present invention submits the objects returned as a result of the previously described tests to the 3D engine for rendering on screen.

Figure 2:
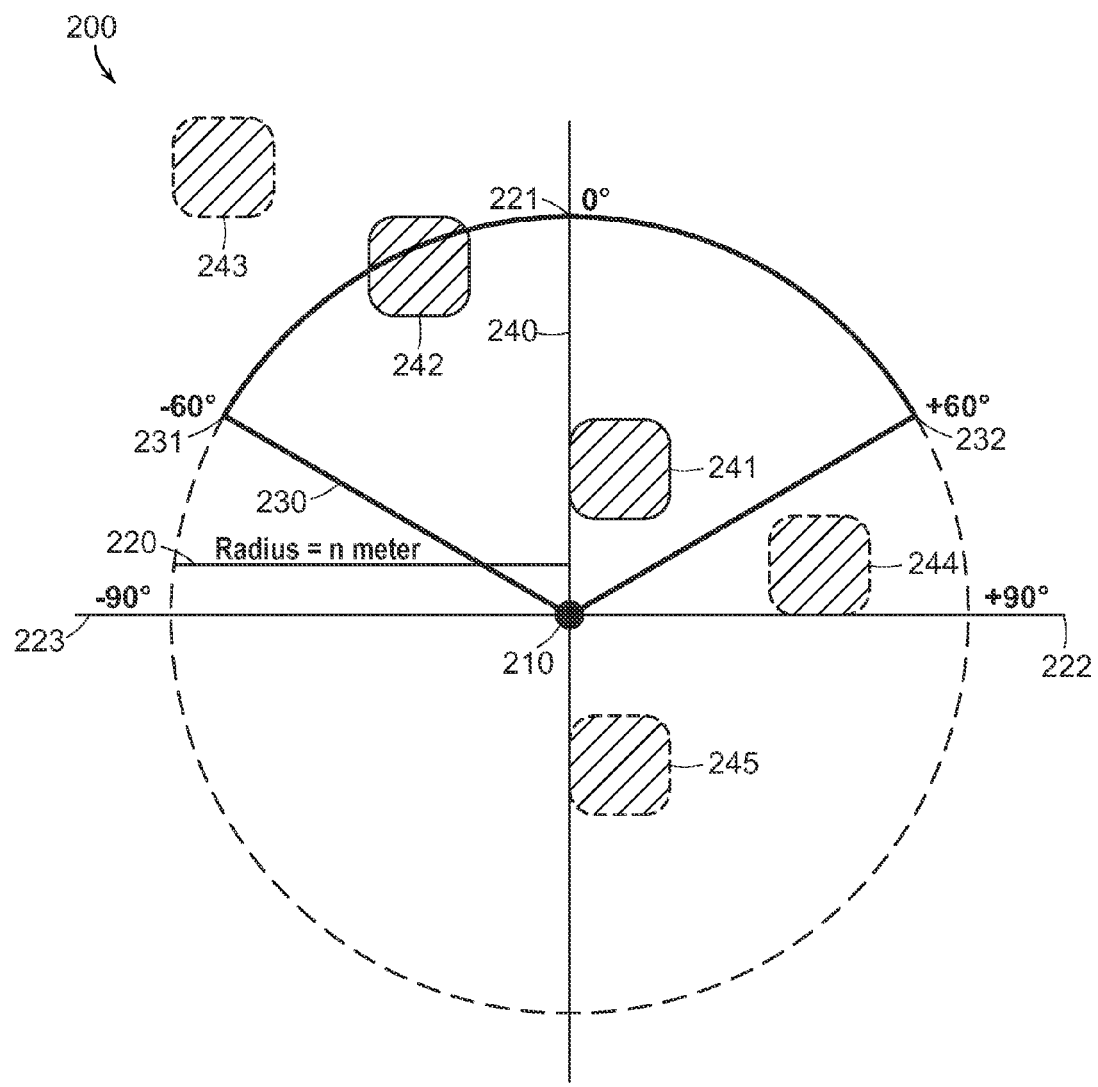
FIG. 2 is a top view or plan view in a BIM/FIM model.
Figure 3:
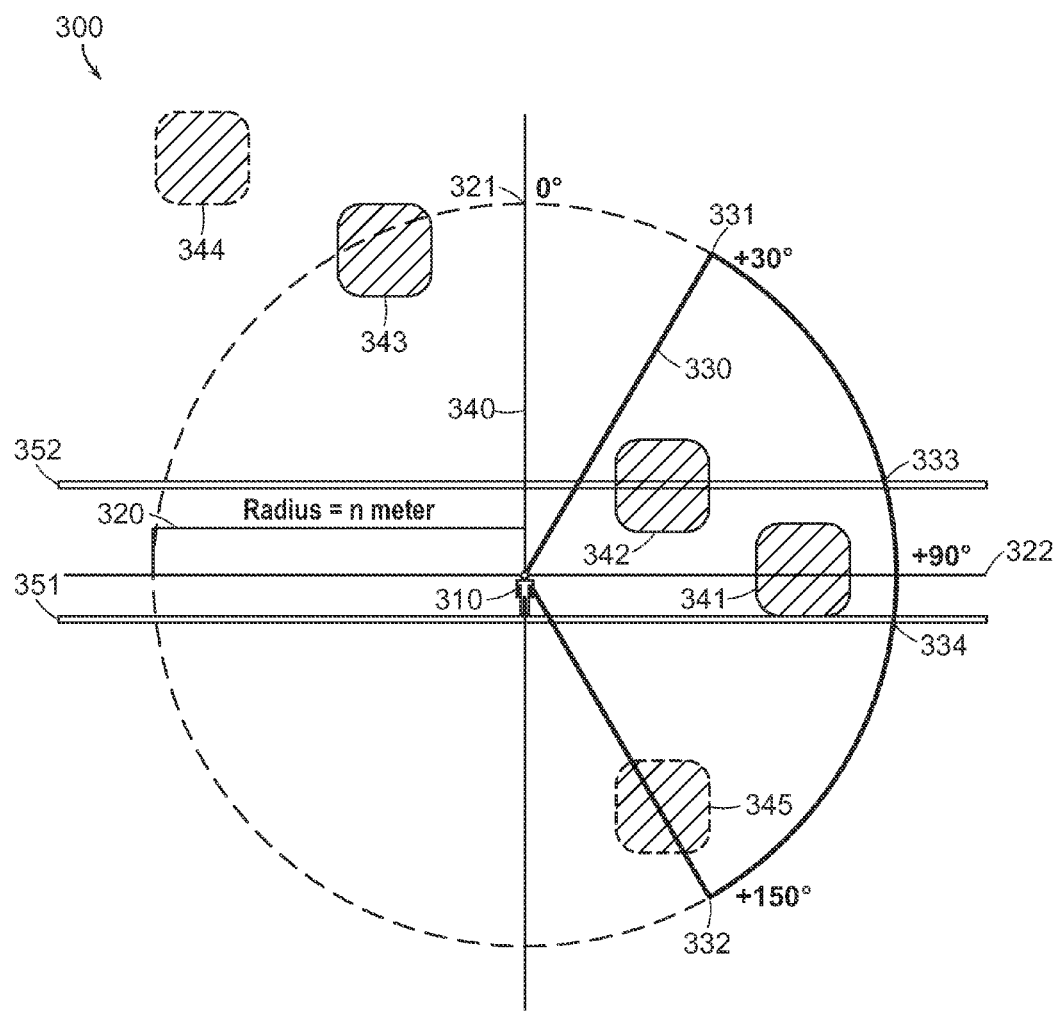
FIG. 3 is a side view or elevation view in a BIM/FIM model.
Figure 4:
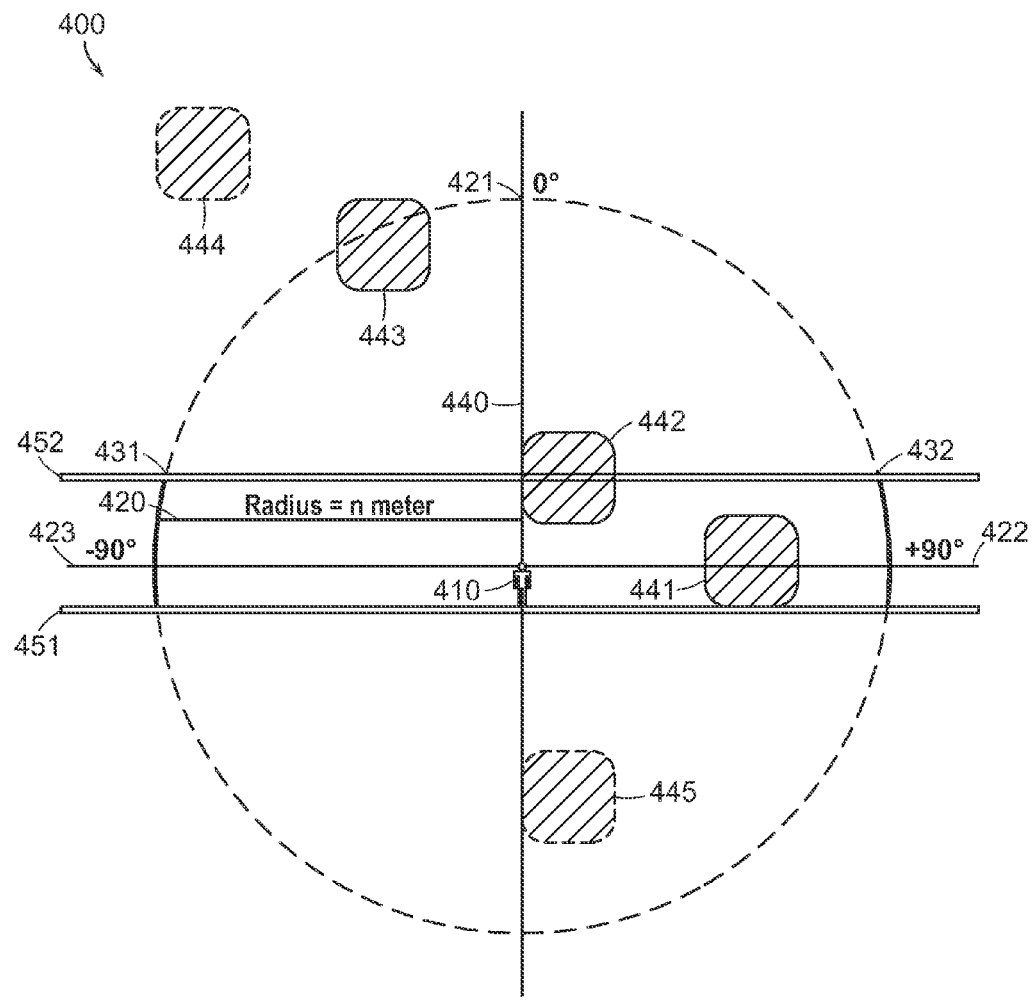
FIG. 4 is a front view or elevation view in a BIM/FIM model.
Figure 6:
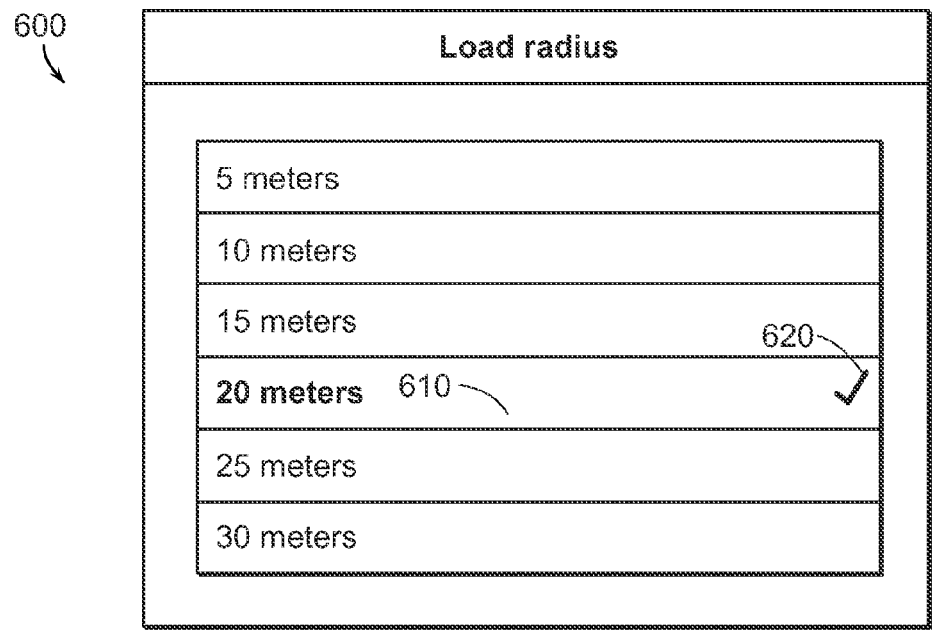
FIG. 6 is an example of a screenshot of the user-interface to configure the load radius.

FIG. 2-4 provide greater detail for navigating and initiating 110 and bounding and testing 120. FIG. 2 is a diagram showing a top view or plan view 200 in a BIM model. Note that FIG. 2 is not to scale. 210 describes the end-user's spatial location virtually and diagrammatically in the BIM ("center of the clock"). 220 Radius=n meters describes the load radius of the "bounding box", as defined by the end-user under Settings, Load Radius. FIG. 6 provides an example of a screenshot of the user-interface to configure the load radius of the present invention.

221 describes the center axis or center line in two-dimensional (2D) space and the center plane in three-dimensional (3D) space at 0° (0 degrees or "twelve o'clock") from the end-user's spatial location virtually and diagrammatically in the BIM. 221 is the center axis or center line and the center plane of the "bounding box". The view cone is the volume within which items are selected for load after having met the criteria of intersection or inclusion in the bounding box. 222 describes the 90° axis or 90° line in two-dimensional (2D) space and 90° plane in three-dimensional (3D) space at +90° (+90 degrees or "three o'clock") from the end-user's spatial location virtually and diagrammatically in the BIM. 223 describes the 90° axis or 90° line in two-dimensional (2D) space and 90° plane in three-dimensional (3D) space at −90° (−90 degrees or "nine o'clock") from the end-user's spatial location virtually and diagrammatically in the BIM. 230 describes the "bounding box". The apex or vertex of 230 starts at the end-user's spatial location virtually and diagrammatically in the BIM ("center of the clock"). 230 extends outward on center with the center axis or center line in two-dimensional (2D) space and the center plane in three-dimensional (3D) space at 0° (0 degrees or "twelve o'clock").

231 describes the left extents of the "bounding box", in a top view or plan view of the present invention. The left extents 231 of the "bounding box" extend at −60° (−60 degrees or "ten o'clock") from the end-user's spatial location virtually and diagrammatically in the BIM ("center of the clock"). The left extents 231 of the "bounding box" stop at the surface of the sphere, defined by the load radius of the present invention (FIG. 6). 232 describes the right extents of the "bounding box", in a top view or plan view of the present invention. The right extents 232 of the "bounding box" extend at +60° (+60 degrees or "two o'clock") from the end-user's spatial location virtually and diagrammatically in the BIM ("center of the clock"). The right extents 232 of the "bounding box" stop at the surface of the sphere, defined by the load radius of the present invention (FIG. 6).

241 describes a model object contained within the "bounding box". Accordingly, model object 241 passes the test per box 123, for box 130 sorting and streaming. 242 describes a model object intersecting the "bounding box". Accordingly, model object 242 passes the test box 123, for box 130 sorting and streaming. 243 describes a model object outside of the "bounding box". Accordingly, model object 243 fails the per box 123, for box 130 sorting and streaming. 244 describes a model object outside of the "bounding box". Accordingly, model object 244 fails the test per box 123, for box 130 sorting and streaming. 245 describes a model object outside of the "bounding box". Accordingly, model object 245 fails the test per box 123, for box 130 sorting and streaming.

FIG. 3 is a diagram showing a side view or elevation view in a BIM model. Note that FIG. 3 is not to scale. 310 describes the end-user's spatial location virtually and diagrammatically in the BIM ("center of the clock"). 320 Radius=n meters describes the load radius of the "bounding box", as defined by the end-user under Settings, Load Radius (FIG. 6). 321 describes the 90° axis or 90° line in two-dimensional (2D) space and 90° plane in three-dimensional (3D) space at +/−90° (+/−90 degrees or "three o'clock" and "nine o'clock") from the end-user's spatial location virtually and diagrammatically in the BIM. 322 describes the center axis or center line in two-dimensional (2D) space and the center plane in three-dimensional (3D) space at 0° (0 degrees or "twelve o'clock") from the end-user's spatial location virtually and diagrammatically in the BIM. 322 is the center axis or center line and the center plane of the "bounding box". 322 at the end-user's eye level virtually and diagrammatically in the BIM.

330 describes the "bounding box". The apex or vertex of 330 starts at the end-user's spatial location and at the end-user's eye level virtually and diagrammatically in the BIM ("center of the clock"). 330 extends outward on center with the center axis or center line in two-dimensional (2D) space and the center plane in three-dimensional (3D) space at 0° (0 degrees or "twelve o'clock"). 331 describes the top or upper extents of the "bounding box", in a side view or elevation view of the present invention. The top or upper extents 331 of the "bounding box" extend at +30° (+30 degrees or "one o'clock") from the end-user's spatial location virtually and diagrammatically in the BIM ("center of the clock"). The top or upper extents 331 of the "bounding box" stop at the surface of the sphere, defined by the load radius (FIG. 6). 332 describes the bottom or lower extents of the "bounding box", in a side view or elevation view of the present invention. The bottom or lower extents 332 of the "bounding box" extend at +150° (+150 degrees or "five o'clock") from the end-user's spatial location virtually and diagrammatically in the BIM ("center of the clock"). The bottom or lower extents 332 of the "bounding box" stop at the surface of the sphere, defined by the load radius (FIG. 6).

351 describes a model object of a horizontal plane or floor slab. 352 also describes a model object of a horizontal plane or floor slab. 341 describes a model object contained within the "bounding box". Accordingly, model object 341 passes the test box 123, for box 130 sorting and streaming. 342 describes a model object intersecting the "bounding box". Accordingly, model object 342 passes the test box 123, for box 130 sorting and streaming. However, model object 342 is not completely visible from the end-user's spatial location virtually and diagrammatically in the BIM ("center of the clock"), as Model Object 352, a horizontal plane or floor slab above intersects and partially obstructs Model Object 342.

343 describes a model object outside of the "bounding box". Accordingly, model object 343 fails the test box 123, for box 130 sorting and streaming. 344 describes a model object outside of the "bounding box". Accordingly, model object 344 fails the test box 123, for box 130 sorting and streaming. 345 describes a model object intersecting the "bounding box". Accordingly, model object 345 passes the test box 123, for box 130 sorting and streaming. However, model object 345 is not visible from the end-user's spatial location virtually and diagrammatically in the BIM ("center of the clock"), as model object 351, a horizontal plane or floor slab below, completely obstructs model object 345 below.

FIG. 4 is a diagram showing a front view or elevation view in the BIM. Note that FIG. 4 is not to scale. 410 describes the end-user's spatial location virtually and diagrammatically in the BIM ("center of the clock"). 420 Radius=n meters describes the load radius of the "bounding box", as defined by the end-user under Settings, Load Radius (FIG. 6). 421 describes the center axis or center line in two-dimensional (2D) space and the center plane in three-dimensional (3D) space at 0° (0 degrees or "twelve o'clock") from the end-user's spatial location virtually and diagrammatically in the BIM. 421 is the center axis or center line and the center plane of the "bounding box". 422 describes the center axis or center line in two-dimensional (2D) space and the center plane in three-dimensional (3D) space at +90° (90 degrees or "three o'clock") from the end-user's spatial location virtually and diagrammatically in the BIM. 422 is the center axis or center line and the center plane of the "bounding box". 423 describes the center axis or center line in two-dimensional (2D) space and the center plane in three-dimensional (3D) space at −90° (−90 degrees or "nine o'clock") from the end-user's spatial location virtually and diagrammatically in the BIM. 423 is the center axis or center line and the center plane of the "bounding box". 422 and 423 are at the end-user's eye level virtually and diagrammatically in the BIM.

431 and 432 describes the "bounding box". The apex or vertex of 431 and 432 start at the end-user's spatial location and at the end-user's eye level virtually and diagrammatically in the BIM ("center of the clock"). 431 and 432 extend outward on center with the center axis or center line in two-dimensional (2D) space and the center plane in three-dimensional (3D) space at 0° (0 degrees or "twelve o'clock"). 451 describes a model object of a horizontal plane or floor slab. 452 also describes a model object of a horizontal plane or floor slab. 441 describes a model object contained within the "bounding box". Accordingly, model object 441 passes the test box 123, for box 130 sorting and streaming. 442 describes a model object contained within the "bounding box". Accordingly, model object 442 passes the test box 123, for box 130 sorting and streaming. However, model object 442 is not completely visible from the end-user's spatial location virtually and diagrammatically in the BIM ("center of the clock"), as model object 452, a horizontal plane or floor slab above, intersects and partially obstructs model object 442.

443 describes a model object intersecting the "bounding box". Accordingly, model object 443 the test box 123, for box 130 sorting and streaming. However, model object 443 is not visible from the end-user's spatial location virtually and diagrammatically in the BIM ("center of the clock"), as model object 452, a horizontal plane or floor slab below, completely obstructs model object 443 above. 444 describes a model object outside of the "bounding box". Accordingly, model object 444 fails the test box 123, for box 130 sorting and streaming. 445 describes a model object contained within the "bounding box". Accordingly, model object 445 passes the test box 123, for box 130 sorting and streaming. However, model object 445 is not visible from the end-user's spatial location virtually and diagrammatically in the BIM ("center of the clock"), as model object 452, a horizontal plane or floor slab below, completely obstructs model object 445 above.

FIG. 6 is an example of a screenshot of the user-interface 600 to configure the load radius. The end-user taps on the display of the mobile device and selects the load radius 610, to configure the load radius of the "bounding box". The end-user's selection is confirmed by displaying a check mark 620 and highlighting the selected load radius in bold font. Methods of the invention make a determination based upon the selected load radius and the objects that are within that radius as to whether the selected sub-section is within or exceeds the maximum load value of the device. If found to exceed the maximum load value, methods of the invention will pause loading until such time as memory becomes available or the load testing process is restarted based on the user's continuing navigation in the model. In this manner, methods of the invention optimize for allowable memory limits and avoid the problem where mobile devices are designed such that an application exceeding the allowable memory limits can shut down and close immediately, and also avoid the problem of causing instability of the application or of the mobile device operating system.

Figure 7:
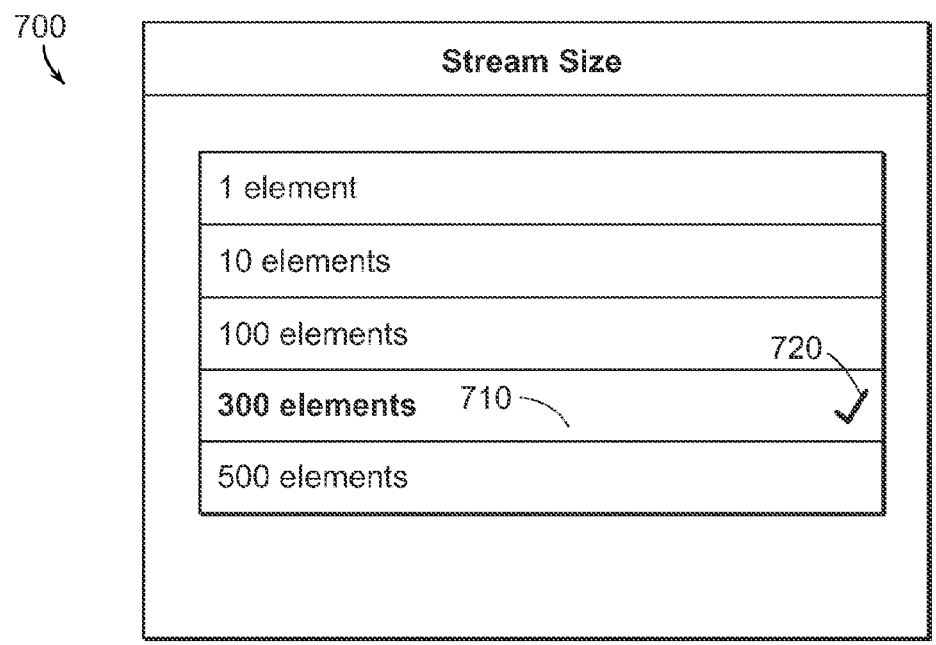
FIG. 7 is an example of a screenshot of the user-interface to configure the stream size.

FIG. 7 is an example of a screenshot 700 of the user-interface to configure the stream size. The end-user taps on the display of the mobile device and selects the stream size 710, to configure the maximum number of model objects or elements to stream. The end-user's selection is confirmed by displaying a check mark 720 and highlighting the selected stream size in bold font.

Figure 5:
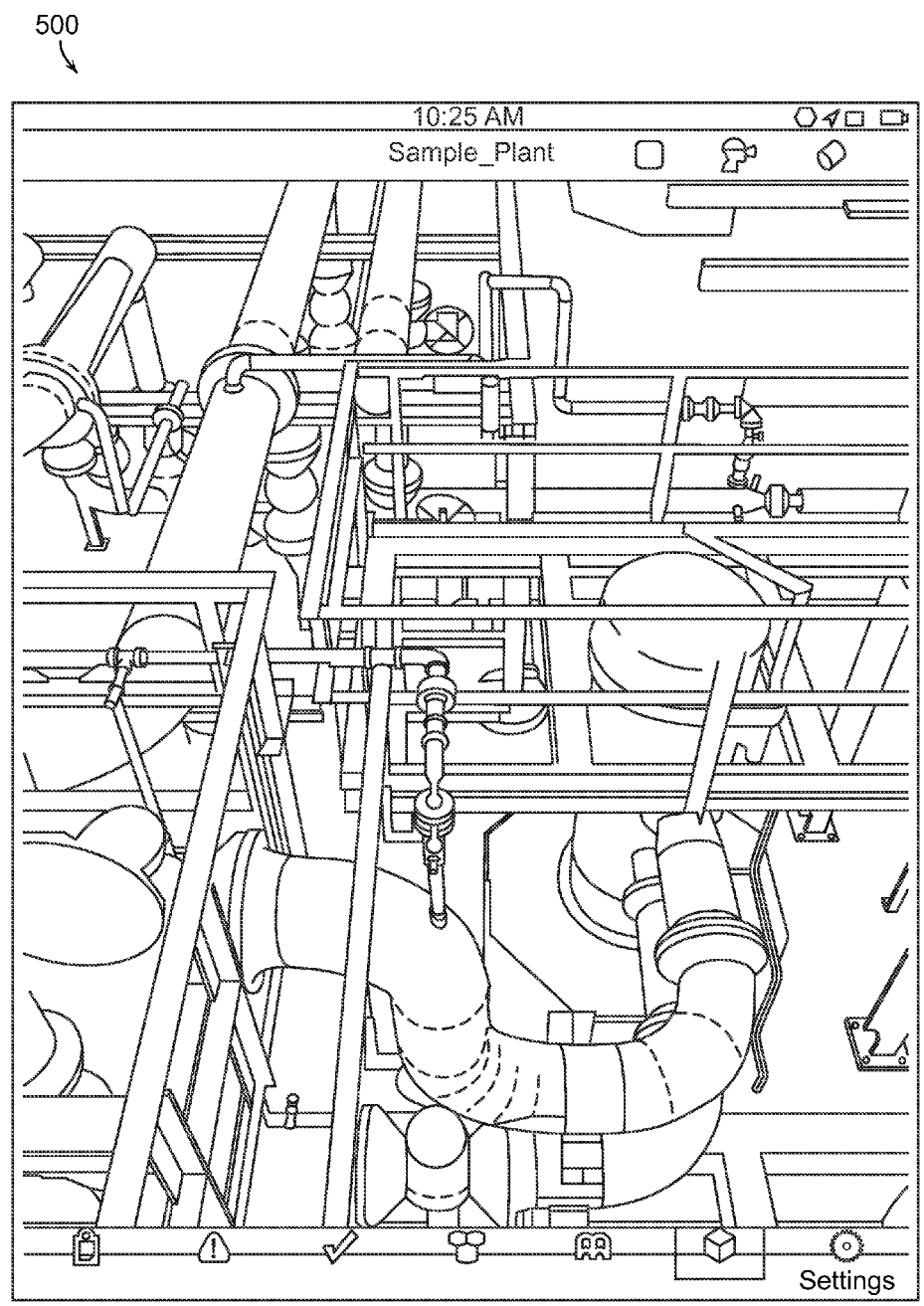
FIG. 5 is an example of a screenshot of display generated based upon methods of the invention. The display is on an iPad.

Based upon all of the determinations made as described above, a sub-section of the entire virtual model is loaded 130 for the user to view. FIG. 5 provides an example of a screenshot 500 of a displayed sub-section of an entire model based upon execution of the above described methods. The display shows model objects in a perspective view, in BIM of a manufacturing plant, as an example.

The methods of use described herein may be embodied in many different forms and should not be construed as limited to the embodiments set forth herein. Accordingly, methods of use described herein may take the form of an entirely hardware embodiment, an entirely software embodiment, or an embodiment combining software and hardware aspects. The methods of use described herein can be performed using any type of computing device, such as a computer, that includes a processor or any combination of computing devices where each device performs at least part of the process or method. Exemplary devices are portable electronic devices, such as a tablet computer (e.g., iPad) or smart phone (e.g., iPhone or Blackberry).

Suitable computing devices typically include mass memory and typically include communication between devices. The mass memory illustrates a type of computer-readable media, namely computer storage media. Computer storage media may include volatile, non-volatile, removable and non-removable media implemented in any method or technology for storage information, such as computer readable instructions, data structures, program modules or other data. Examples of storage media include RAM, ROM, EEPROM, flash memory, or other memory technology, CD-ROM, digital versatile disks (DVD) or other optical storage, magnetic cassettes, magnetic tape, magnetic disk storage or other magnetic storage devices, radiofrequency identification tags or chips, or any other medium which can be used to store the desired information and which can be accessed by a computing device.

Certain disclosed embodiments relate to and/or include computer storage. The storage can be in the form of one or more computer-readable mediums having data and/or executable instructions (also called computer programs, code, or software) stored thereon or therein. The software is for performing various computer-implemented processing operations such as any or all of the various operations, functions, and capabilities described herein. The term "computer-readable medium" is used herein to include any medium capable of storing data and/or storing or encoding a sequence of computer-executable instructions or code for performing the processing operations described herein. The media and code can be those specially designed and constructed for the purposes of the invention, or can be of the kind well known and available to those having ordinary skill in the computer and/or software arts. Examples of computer-readable media include computer-readable storage media such as: magnetic media such as fixed disks, floppy disks, and magnetic tape; optical media such as Compact Disc-Read Only Memories ("CD-ROMs") and holographic devices; magneto-optical media such as floptical disks; memory sticks "flash drives" and hardware devices that are specially configured to store and execute program code, such as Application-Specific Integrated Circuits ("ASICs"), Programmable Logic Devices ("PLDs"), Read Only Memory ("ROM") devices, and Random Access Memory ("RAM") devices. Examples of computer-executable program instructions or code include machine code, such as produced by a compiler, and files containing higher level code that are executed by a computer using an interpreter. For example, an embodiment of the invention may be implemented using Java, C++, Ruby on Rails (RoR) or other programming language and development tools. Additional examples of instructions or code include encrypted code and compressed code. Other embodiments of the invention can be implemented in whole or in part with hardwired circuitry in place of, or in combination with, program instructions/code.

Methods of communication between devices or components of a system can include both wired, wireless, or cellular (e.g., radiofrequency, optical or infrared, optics including fiber-optics and or lens systems) communication methods and such methods provide any other type of computer readable communications media. Such communications media typically embodies computer-readable instructions, data structures, program modules, or other data in a modulated data signal such as a carrier wave, data signal, or other transport mechanism and include any information delivery media. The terms "modulated data signal" and "carrier-wave signal" includes a signal that has one or more of its characteristics set or changed in such a manner as to encode information, instructions, data, and the like, in the signal. By way of example, communication media includes wired media and wireless media such as acoustic, radiofrequency, infrared, and other wireless media.

In one embodiment, the network is, for example, a local-area network (LAN), such as a company Intranet, a wide area network (WAN), such as the Internet or the World Wide Web, or a cellular network. Users of the remote clients can be connected to the network through a variety of connections including, but not limited to, standard telephone lines, LAN or WAN links (e.g., T1, T3, 56 kb, X.25), broadband connections (e.g., ISDN, Frame Relay, ATM), or wireless connections. The connections can be established using a variety of communication protocols (e.g., HTTP, TCP/IP, IPX, SPX, NetBios, Ethernet, RS232, and direct asynchronous connections).

Methods and devices herein work occasionally connected to the Internet, both online and connected to the Internet, and offline and disconnected to the Internet, on mobile devices. In particular embodiments, the present invention allows one or many end-users, such as construction field personnel and other construction project stakeholders, to work disconnected from the Internet. Working disconnected from the Internet is important for performing construction field operations as wireless Internet access and other forms of wireless networking, such as IEEE 802.11, Wi-Fi and WiMax, HiperLan, OpenAir, etc., may not be always available and may be limited in signal strength out in the field, on the job site and at the point of construction, due to the constraints of the job site and wireless signal obstructions from building assemblies, systems, equipment and components.

The present invention allows one or many end-users to synchronize information back to a central version of the model after re-connecting to the Internet. The present invention uses synchronization rules and business logic to resolve and to prevent conflicts when combining the information from many end-users over the duration of the construction, commissioning, operations, maintenance, re-use and repair of the facility. The rules are set as "last change wins" rules at the object level and attribute level unless otherwise changed. Each change is a read-only change and each change is date/time stamped and read-only author stamped so that there is a history log/audit trail. Permissions to create, read, update, and delete at the object level and attribute level is set by the administrator using a permissions configurator. Thus many users are able to access, interact with and author data structures and data sets at the same time when disconnected from the Internet and accordingly disconnected from each other, and then synchronize to share the data structures and data sets when connected to the Internet and accordingly with each other.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein.

What is claimed is:

1. A method for displaying a sub-section of a virtual model on a device, the method comprising:
    determining a portion of a virtual model that is within a field of view of a user;
    determining a maximum memory load value that can be accommodated by the device; and
    displaying a sub-section of the virtual model based upon the portion that is within the user's field of view and the maximum memory load value that can be accommodated by the device.

2. The method according to claim 1, wherein the model is a building information model or facility information model.

3. The method according to claim 2, wherein the sub-section of the model comprises at least one object.

4. The method according to claim 3, wherein the at least one object is a plurality of objects.

5. The method according to claim 4, further comprising loading the objects in a certain order.

6. The method according to claim 5, wherein loading is based upon at least one parameter selected from the group consisting of: the object size within the model, proximity of the object within the model to the user, the number of objects, relevance of the object to the user, and a combination thereof.

7. The method according to claim 3, wherein the object comprises at least one attribute.

8. The method according to claim 7, wherein the attribute relates to building assemblies, materials, systems, sub-systems, equipment, components, elements, materials, and inter-relations thereof in a building project.

9. The method according to claim 7, wherein the attribute relates to non-building assemblies, materials, systems, sub-systems, equipment, components, elements, materials, and inter-relations thereof in a non-building project.

10. The method according to claim 7, wherein the attribute relates to at least one field process selected from the group consisting of: issues management, work-to-complete list management, work-to-correct list management, punch list management, quality assurance management, quality control management, environmental management, health management, safety management, sustainability management, field report management, materials management, waste management, commissioning, re-commissioning, retro-commissioning, decommissioning, handover, turnover, operations, maintenance, repair, retrofit, turnaround, and a combination thereof.

11. The method according to claim 1, wherein the device is capable of making a connection selected from the group consisting of: a wired connection, a wireless connection, a cellular connection, and a combination thereof.

12. The method according to claim 1, wherein the device functions with access to a computer network, cellular network, or the internet.

13. The method according to claim 1, wherein the device functions without access to a computer network, cellular network, or the internet.

14. The method according to claim 1, wherein the device comprises a display and is capable of receiving data transferred via an internet or cellular connection.

15. The method according to claim 14, wherein the device is selected from the group consisting of a laptop computer, a tablet computer, and a portable handheld device.

16. The method according to claim 15, wherein the portable handheld device is a smart phone.

17. A device for displaying a sub-section of a virtual model, the device comprising: a display, a central processing unit (CPU); and storage coupled to the CPU for storing instructions that when executed by the CPU cause the CPU to:
determine a portion of a virtual model that is within a field of view of a user;
determine a maximum memory load value that can be accommodated by the device; and
display a sub-section of the virtual model based upon the portion that is within the user's field of view and the maximum memory load value that can be accommodated by the device.

18. The device according to claim 17, wherein the model is a building information model or facility information model.

19. The device according to claim 18, wherein the sub-section of the model comprises at least one object.

20. The device according to claim 19, wherein the at least one object is a plurality of objects.

21. The device according to claim 20, further comprising instructions that when executed by the CPU cause the CPU to: load the objects in a certain order.

22. The device according to claim 21, wherein loading is based upon at least one parameter selected from the group consisting of: the object size within the model, proximity of the object to the user within the model, the number of objects, relevance of the object to the user, and a combination thereof.

23. The device according to claim 19, wherein the object comprises at least one attribute.

24. The device according to claim 23, wherein the attribute relates to building assemblies, materials, systems, sub-systems, equipment, components, and inter-relations thereof in a building project.

25. The device according to claim 23, wherein the attribute relates to non-building assemblies, materials, systems, sub-systems, equipment, components, elements, materials, and inter-relations thereof in a non-building project.

26. The device according to claim 23, wherein the attribute relates to at least one field process selected from the group consisting of: issues management, work-to-complete list management, work-to-correct list management, punch list management, quality assurance management, quality control management, environmental management, health management, safety management, sustainability management, field report management, materials management, waste management, commissioning, re-commissioning, retro-commissioning, decommissioning, handover, turnover, operations, maintenance, repair, retrofit, turnaround, and a combination thereof.

27. The device according to claim 17, wherein the device is capable of connecting to a connection selected from the group consisting of: a wired connection, a wireless connection, cellular connection, and a combination thereof.

28. The device according to claim 17, wherein the device functions with access to a computer network, cellular network, or the internet.

29. The device according to claim 17, wherein the device functions without access to a computer network, cellular network, or the internet.

30. The device according to claim 17, wherein the device is capable of receiving data transferred via an internet or cellular connection.

31. The device according to claim 30, wherein the device is selected from the group consisting of a laptop computer, a tablet computer, and a portable handheld device.

32. The device according to claim 31, wherein the portable handheld device is a smart phone.

* * * * *